United States Patent [19]
Williams

[11] Patent Number: 5,740,922
[45] Date of Patent: Apr. 21, 1998

[54] SIZING SCREEN WITH INDIVIDUAL ROW SPACING ADJUSTABILITY

[75] Inventor: Stephen G. Williams, Blackfoot, Id.

[73] Assignee: Milestone Blackfoot, Inc., Blackfoot, Id.

[21] Appl. No.: 580,628

[22] Filed: Dec. 29, 1995

[51] Int. Cl.$^6$ .................................................. B07B 13/05
[52] U.S. Cl. .................................. 209/668; 209/672
[58] Field of Search .......................... 209/659, 660, 209/667, 668, 669, 671, 672

[56] References Cited

U.S. PATENT DOCUMENTS

| | | | |
|---|---|---|---|
| 3,721,345 | 3/1973 | Brown et al. | 209/669 |
| 4,148,398 | 4/1979 | Mustikka | 209/668 |
| 4,253,574 | 3/1981 | Ross | 209/668 |
| 5,060,806 | 10/1991 | Savage | 209/672 X |
| 5,480,034 | 1/1996 | Kobayashi | 209/672 X |

FOREIGN PATENT DOCUMENTS

| | | | |
|---|---|---|---|
| 1382473 | 3/1988 | U.S.S.R. | 209/668 |

*Primary Examiner*—Tuan Nguyen
*Attorney, Agent, or Firm*—Mallinckrodt & Mallinckrodt

[57] ABSTRACT

Sizing screen apparatus is provided with mechanism for enabling the extent of spacings, longitudinally of an elongate sizing screen between transversely extending, individual rows of spacing members, to be adjusted individually. Each transversely extending row of sizing members is mounted on a rotatable shaft journaled at its opposite ends in the lower end portions of a pair of mounting arms that are pivoted at their upper end portions to opposite longitudinal side members of a supporting frame and hang downwardly for back and forth space adjusting movement. The mounting arms of the pair are pivotally interconnected adjacent their lower ends with an elongate connection member of an operating device that is manually or power operated. The connection is made by preferably a pair of rods at opposite sides, respectively, of the sizing screen and having one set of corresponding ends pivotally attached to the respective mounting arms of the pair and the set of opposite ends fixedly attached to the connection member of the operating device in a length adjustable manner, as by providing such opposite ends with screw threading, passing them through respective bracket members of a series of same that are immovably affixed to the connection member, making the lengthwise adjustment by screwing a set of lock nuts at opposite sides of such bracket members, and tightening such lock nuts to lock the adjustments in place.

4 Claims, 3 Drawing Sheets

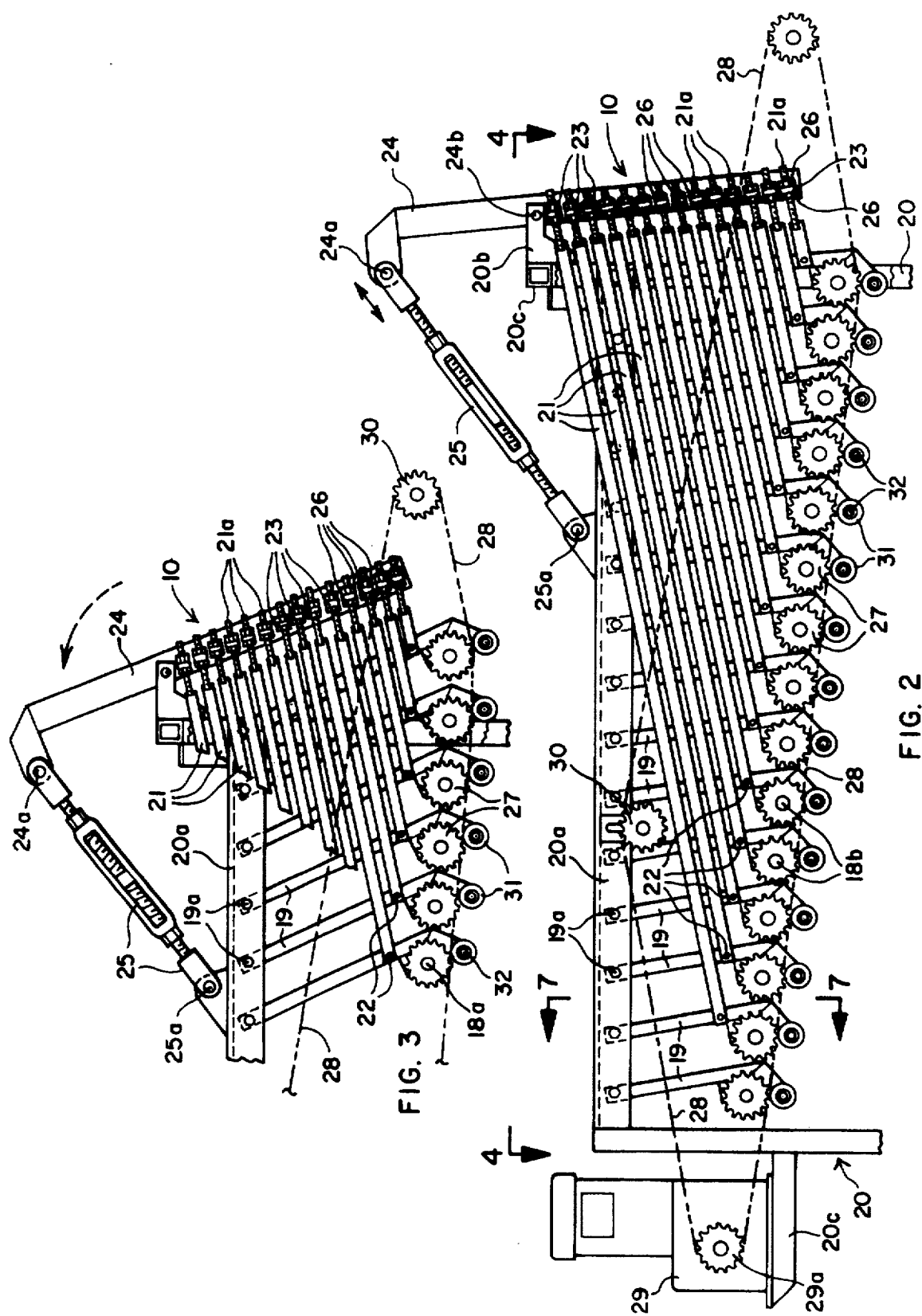

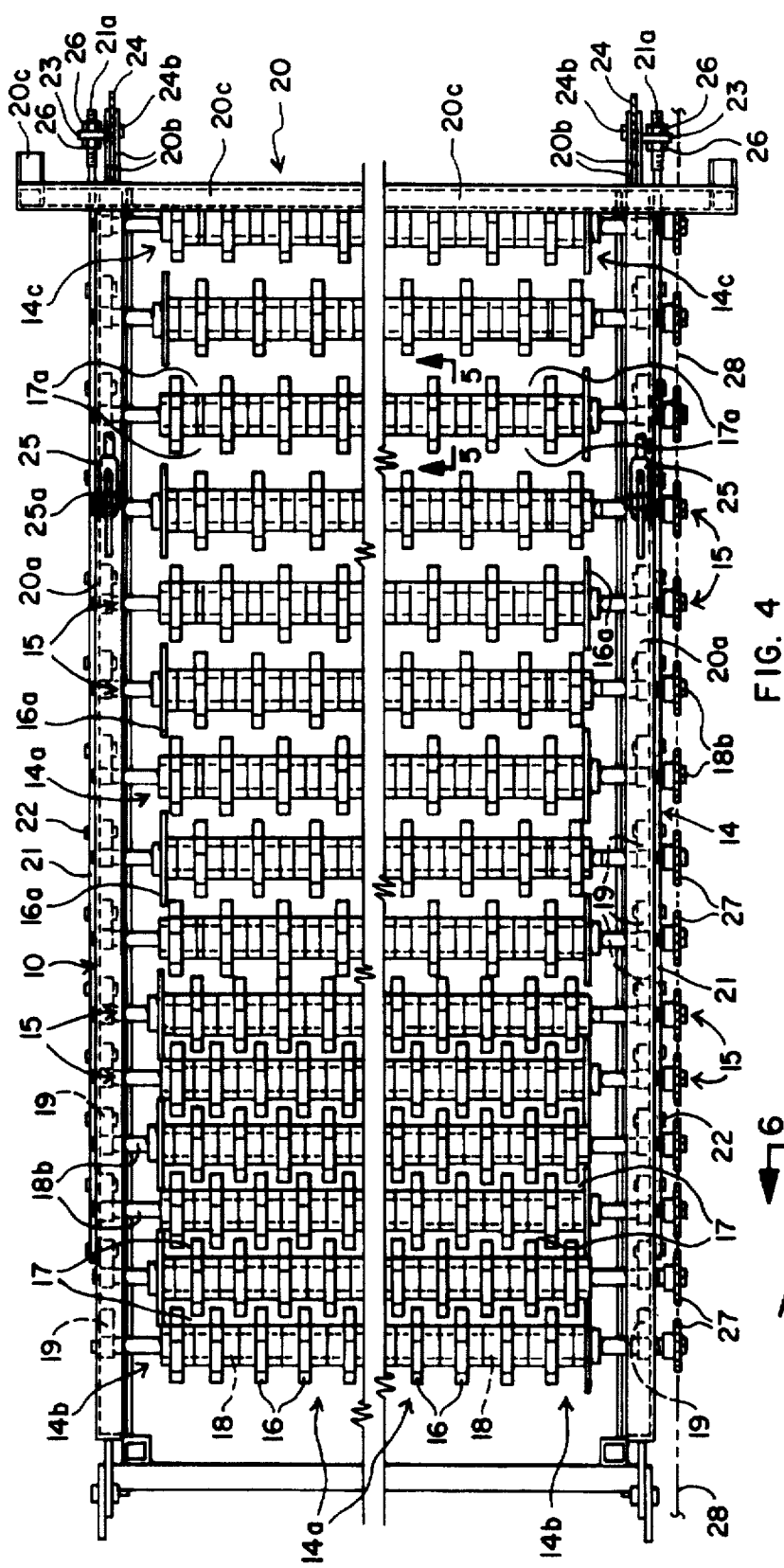
FIG. 4
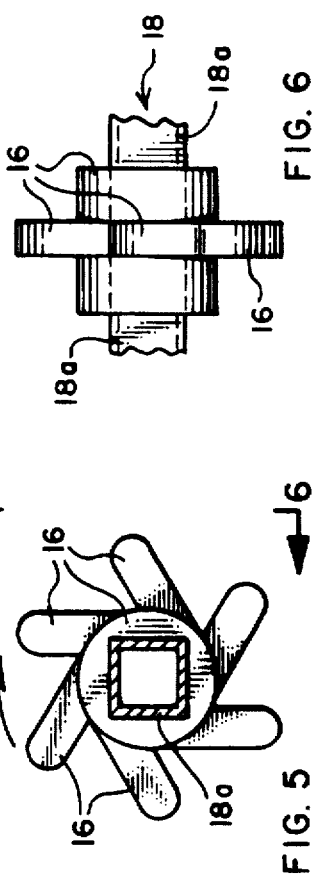
FIG. 6
FIG. 5

SIZING SCREEN WITH INDIVIDUAL ROW SPACING ADJUSTABILITY

BACKGROUND OF THE INVENTION

1. Field

The invention is in the field of sizing screen equipment for agricultural products, such as potatoes, onions, apples, and other similar vegetables and fruits in which multiple rows of sizing members, that extend transversely of the line of travel of a mass of such items of different sizes, are spaced apart in serial relationship longitudinally of such line of travel.

2. State of the Art

Screening equipment of the type concerned has been on the market for several years and has operated quite satisfactorily, except for the fact that row spacing is not individually adjustable. When adjustments are made in row spacings longitudinally from end-to-end of the sizing screen deck of such equipment, the spacings of all rows one from another are changed to an equal extent simultaneously by a single adjusting operation. Sizing screen apparatus of this type is shown in Brown et al. U.S. Pat. No. 3,721,345 of Mar. 20, 1973 entitled "Method and Machine for Selecting Potatoes of Given Size from Massed Potatoes of Random Size".

SUMMARY OF THE INVENTION

A principal objective in the making of the present invention was to provide for fine scale adjustability of individual spacings, longitudinally of a sizing screen deck, of transverse rows of sizing members and to do so in apparatus that is simple to adjust. A further objective was to provide mechanism for the purpose that is economical to produce and effective in its operation.

In accomplishing these objectives, a principal feature of the invention is the providing of individual adjustment means for each of the multiple rows to be adjusted, such means being tied in with means mounting for rotation opposite ends of each of the multiple rows of screening members (such as star wheels or the sizing rolls of the aforenoted patent), so such rows will be moved simultaneously to adjusted positions longitudinally of the sizing screen.

The preferred mounting of the individual rows is transversely of the deck pivotally to and between a pair of arms at opposite sides of the sizing screen, which arms hang from pivotal attachment to a stationary frame that extends longitudinally of the screen deck, opposite ends of each row being rotatably mounted in lower end portions of the hanging arms of corresponding pairs of such arms at opposite sides of the screening deck, respectively.

The preferred individual adjustment mechanism comprises elongate rods extending longitudinally of the screening deck preferably at opposite sides thereof, respectively, as individual, elongate, connecting members and pivotally connected at one set of corresponding ends to one of the hanging arms of the pair and extending longitudinally of the screening deck to adjustable connection at its opposite set of corresponding ends with elongate, upstanding structure and operating means in common for all of the rods, such as an elongate, lever pivoted at one end to a manually operated turnbuckle or power means such as a hydraulic piston and cylinder arrangement. The adjustable connections are preferably threaded ends for the respective rods passing through corresponding bracket members of a series that are fastened to and along the lever member, such threaded ends of the respective rods being adjustably attached to the corresponding bracket members by respective sets of lock nuts.

Spacings between mutually adjoining rows of screening members are individually adjustable by changing the effective lengths of the rods controlling the positions of such mutually adjoining rows relative to one another. In the preferred form indicated, the changing of length is accomplished by turning the lock nuts of each set in appropriate directions to effectively shorten or lengthen the particular rod or rods concerned and to lock the resulting adjustment. This is spoken of as a "fine tuning" operation.

THE DRAWINGS

The best mode presently contemplated for carrying out the invention in commercial practice is shown in the accompanying drawings in which:

FIG. 1 is a largely schematic representation in side elevation of a complete potato harvesting and sizing machine embodying a preferred embodiment of the sizing screen apparatus of the invention;

FIG. 2, an enlargement of the sizing screen apparatus portion of the machine of FIG. 1 indicating its use independently of the complete machine;

FIG. 3, a fragmentary view showing the right-hand end portion of FIG. 2 slightly increased in size;

FIG. 4, a horizontal section taken on the line 4—4 of FIG. 2, a longitudinal central section of the apparatus having been broken out for convenience of illustration;

FIG. 5, a detail vertical section taken on the line 5—5 of FIG. 4 and drawn to a larger scale;

FIG. 6, a view on side elevation of the detail shown in FIG. 5; and

FIG. 7, a transverse vertical section taken on the line 7—7 of FIG. 2 drawn to a larger scale and shown with a central portion broken out for convenience of illustration.

DETAILED DESCRIPTION OF THE ILLUSTRATED EMBODIMENT

Figure 1:
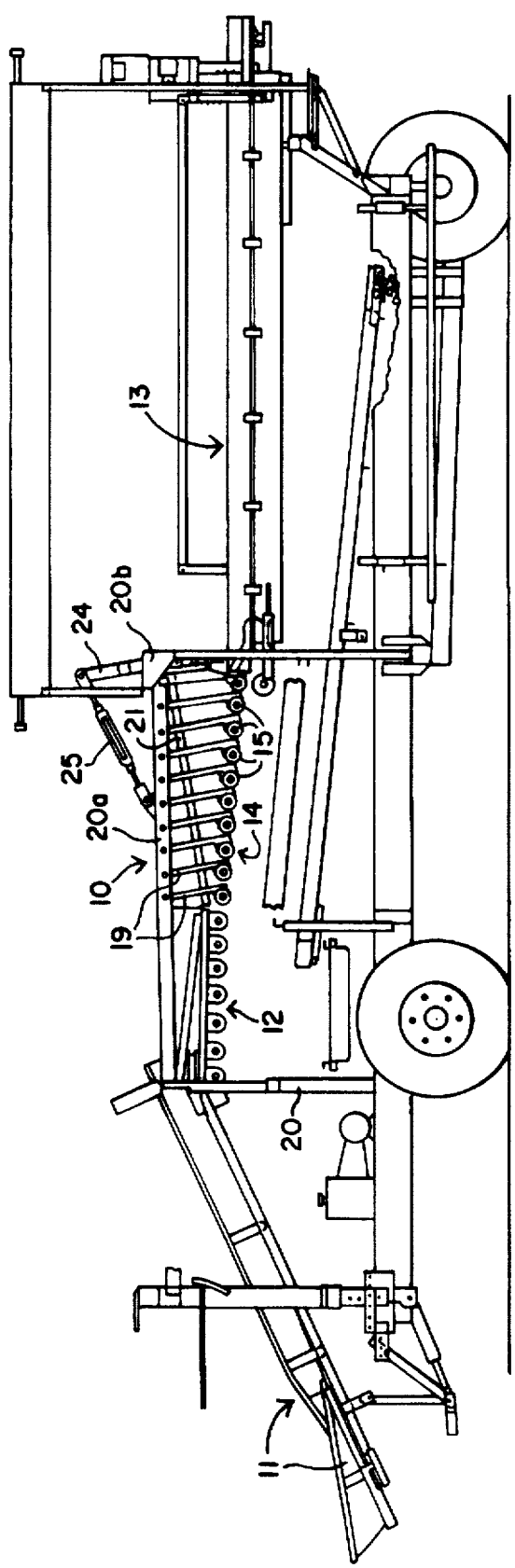

As illustrated in FIG. 1, the showing of sizing screen apparatus 10 of the invention indicates in general how it can be included as part of an overall agricultural machine for travel through a potato field to dig potatoes by a conventional digger portion 11 of the machine, to pass the dug potatoes to a conventional cleaning screen 12, to then pass the cleaned potatoes to the sizing screen apparatus 10 of the invention for separation of undersize items from items of desired size which are retained on the deck of the sizing screen for eventual discharge onto an inspection table 13.

The apparatus 10 of the invention as shown in FIGS. 2–7 comprises an elongate sizing screen 14 provided by a series of spaced rows 15 of side-by-side sizing members 16 extending transversely of the apparatus to form a sizing screen deck 14a, FIG. 4, that extends longitudinally of the apparatus from a loading end 14b of such screen to a discharge end 14c thereof.

Although the sizing members 16 of each row may take a variety of forms, such as the scalloped screw formations of U. S. Pat. No. 3,721,345, providing therebetween within each row 15, and within the spacings between mutually adjacent rows 15, sizing openings such as 17 and 17a, FIG. 4, for the passage therethrough of off-sized potatoes (or other items being handled by such sizing apparatus), it is presently preferred to use for each row a side-by-side series of individual star wheels as the sizing members 16, as shown in FIG. 5, fixedly mounted in common on the intermediate portion 18a (which is polygonal in transverse section) of a shaft 18, FIG. 7, whose opposite ends 18b are cylindrical and are rotatably mounted in a pair of arms or longitudinally movable members 19, (respectively, FIGS. 2, 3, and 4, that hang from pivotal attachment, as at 19a, to opposite longitudinal side members 20a, respectively, of a stationary frame 20.

The sizing members 16 are preferably such as to advance items to be sized along the sizing deck 14 from a heterogeneous mass of same at the loading end 14a of the deck to the delivery end 14b of the deck for those items not eliminated by dropping through the various sizing openings 17 and 17a. Use of star wheels has been found particularly advantageous from this standpoint. A slight downward slope of the sizing deck from loading to delivery end, as indicated in FIG. 2, is helpful.

Alternate rows 15, see FIG. 4, have item-retaining discs 16a secured to opposite ends, respectively, of their shafts 18.

Figure 7:
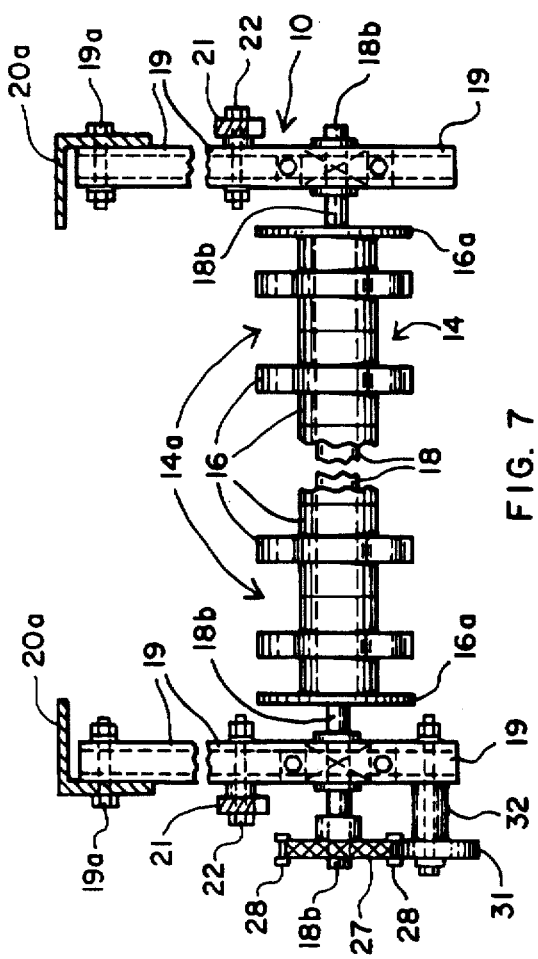

Mechanism for enabling the extent of the individual spacings, longitudinally of sizing screen 14, of transverse rows 15 of sizing members 16 from one another comprise, for each row, a pair of elongate rods 21, FIGS. 2, 4, and 7, at opposite sides, respectively, FIG. 4, of the sizing screen, one set of ends of the rods of the pair being pivotally attached, as at 22, to arms 19 at a corresponding side of the sizing screen 14 and the opposite set of ends being threaded, as at 21a, and extending through corresponding brackets 23, respectively, of a series of same that are affixed to and extend along a corresponding elongate, upstanding, structural member 24 of a pair of same that are pivotally attached, as at 24a, to respective operating devices, here manually operated turnbuckles 25, respectively, that are pivotally mounted as at 25a, on longitudinal frame members 20a, respectively. (However, the operating devices may be powered as, for example, by a hydraulic piston and cylinder arrangement). Structural members 24 of each pair are pivotally mounted intermediate their lengths, as at 24b, on rearwardly extending arms 20b, respectively, FIG. 2, of respective frame members 20c at opposite sides of the sizing screen 14 as levers.

Corresponding length adjustments of the rods 21 of the paired series are made by turning, in appropriate directions, lock nuts 26 of sets of same that are screwed onto the threaded ends 21a, respectively, of the rods 21 at opposite sides of the corresponding brackets 23.

For rotating shafts 18 of the rows 15 of sizing members 16 that are non-rotatably affixed to the shafts, a series of sprocket wheels 27, FIGS. 2 and 4, are non-rotatably affixed to a set of ends 18b, FIGS. 4 and 7, of shafts 18 at one side of sizing screen 14 and are driven by a sprocket chain 28 from a drive sprocket 29a, FIG. 2 of a drive motor 29 that is mounted on a platform 20c extending forwardly from frame 20, idler sprocket wheels 30 being suitably mounted as indicated.

Chain keeper wheels 31, see especially FIG. 7, preferably made of a urethane plastic, are desirably mounted by stub shafts 32 for each row 15, the stub shafts being themselves rotatably mounted in the lower end portions of hanging arms 19, respectively. Each of the chain keeper wheels 31 is preferably mounted off-center to enable tightening of drive chain 28 where and when required.

Although the foregoing mounting and drive arrangement is convenient and effective, other arrangements may be utilized depending upon whether the sizing screen apparatus of the invention is fitted into an overall machine, as for example that indicated in FIG. 1, or is used alone. If used alone, the frame is desirably provided with wheels for mobility in moving it from place to place. The items to be sized may be fed onto the loading end of the sizing screen from a suitable hopper.

Whereas this invention is here illustrated and described with reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. Sizing screen apparatus for agricultural produce, comprising an elongate sizing screen having a sizing deck extending longitudinally from a loading end thereof to a final discharge end thereof; a supporting frame within which said screen is mounted; said screen comprising a longitudinal series of transverse rows of sizing members that are mounted side-by-side in the respective rows on shaft means for rotation; longitudinally movable members pivotally mounted in said frame and rotatably receiving said shaft means, respectively, for supporting the respective rows of sizing members, said rows being spaced apart from one another longitudinally of said sizing screen to define respective transverse series of sizing openings for passing therethrough various sized items from a mass of agricultural produce that is loaded on the screen deck at the loading end thereof and that travels on and along said deck toward the discharge end thereof; and mechanism for adjusting the extent of the respective spacings longitudinally of said deck between mutually adjoining, individual rows relative to one another, said mechanism comprising longitudinally movable structure mounted on and adjacent to one end of said frame, a series of individual, elongate, connecting members extending side-by-side longitudinally of said screen and connected at one set of their corresponding ends, respectively, to said longitudinally movable structure and at the opposite set of their corresponding ends to said longitudinally movable members, and means for moving said longitudinally movable structure back or forth longitudinally of said screen for simultaneously adjusting the spacings between rows of said sizing members; and means for selectively shortening or lengthening the effective lengths of the individual, elongate, connecting members, respectively, to individually adjust the extent of spacings between mutually adjoining rows of said sizing members, said means comprising coactive, length-adjustable means interconnecting said one set of ends, respectively, with said longitudinally movable structure.

2. Apparatus according to claim 1, in which the sizing members are star wheels.

3. Sizing screen apparatus for agricultural produce, comprising an elongate sizing screen having a sizing deck extending longitudinally from a loading end thereof to a final discharge end thereof; a supporting frame within which said screen is mounted; said screen comprising a longitudinal series of transverse rows of sizing members that are mounted side-by-side in the respective rows on shaft means for rotation; longitudinally movable members pivotally mounted in said frame and rotatably receiving said shaft means, respectively, for supporting the respective rows of sizing members, said rows being spaced apart from one another longitudinally of said sizing screen to define respective transverse series of sizing openings for passing therethrough various sized items from a mass of agricultural produce that is loaded on the screen deck at the loading end thereof and that travels on and along said deck toward the discharge end thereof; and mechanism for adjusting the extent of the respective spacings longitudinally of said deck between mutually adjoining, individual rows relative to one another, said mechanism comprising longitudinally movable structure mounted on and adjacent to one end of said frame, a series of individual, elongate, connecting members extending side-by-side longitudinally of said screen and connected at one set of their corresponding ends, respectively, to said longitudinally movable structure and at the opposite set of their corresponding ends to said longitudinally movable members, and means for moving said longitudinally movable structure back or forth longitudinally of said screen for simultaneously adjusting the spacings between rows of said sizing members; and means for selectively shortening or lengthening the effective lengths of the individual, elongate, connecting members, respectively, to individually adjust the extent of spacings between mutually adjoining rows of said sizing members, said means comprising coactive, length-adjustable means interconnecting said one set of ends, respectively, with said longitudinally movable structure; wherein, the individual, elongate, connecting members are rods having the one set of ends that are connected to the longitudinally movable structure threaded; and wherein the means for selectively shortening or lengthening the effective lengths of the individual, elongate, connection members include a corresponding series of brackets that are affixed to the longitudinally movable structure and through which the threaded ends of the connecting members are passed, respectively; and sets of lock nuts threaded onto said threaded ends, respectively, for effecting the desired lengthwise adjustments and for locking said adjustments in place.

4. Apparatus according to claim 1, in which the longitudinally movable members constitute longitudinal series of longitudinally spaced individual members, each series pivotally mounted at an upper end to a longitudinal frame member of the supporting frame at and extending along a longitudinal side of the sizing screen, said longitudinally movable members hanging down therefrom to pivotal connection with opposite ends, respectively, of the shaft of a corresponding row of the sizing members; the longitudinally movable structure comprises a pair of elongate, upstanding, structural members at opposite longitudinal sides, respectively, and at one end of the sizing screen and pivotally mounted thereat to said frame as levers, respectively; the means for moving the longitudinally movable structure back and forth comprise paired moving devices connected to said levers, respectively; the series of individual, elongate, connecting members comprise paired series at and along opposite longitudinal sides of the sizing screen, each member of which is an elongate rod; the coactive, length-adjustable means comprise series of brackets extending along work arms, respectively, of said levers, and through which the one set of ends of the corresponding series of rods extend, and means for locking the said rod ends in their respective brackets.

* * * * *